US008996508B2

(12) United States Patent
Merenda et al.

(10) Patent No.: US 8,996,508 B2
(45) Date of Patent: Mar. 31, 2015

(54) SENDING ADVERTISEMENTS TO CUSTOMERS

(75) Inventors: Ann C. Merenda, Pleasant Valley, NY (US); Hilon Potter, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 1991 days.

(21) Appl. No.: 10/390,956

(22) Filed: Mar. 18, 2003

(65) Prior Publication Data

US 2003/0233357 A1   Dec. 18, 2003

Related U.S. Application Data

(62) Division of application No. 09/563,639, filed on May 2, 2000, now abandoned.

(51) Int. Cl.
*G06F 7/00* (2006.01)
*G06F 17/30* (2006.01)

(52) U.S. Cl.
CPC .................................. *G06F 17/3089* (2013.01)
USPC ........................................................ 707/722

(58) Field of Classification Search
USPC ........ 707/104.1, 8, 100, 10, 513, 104, 1, 200, 707/101, 999.101, 999.102, 722; 705/14
See application file for complete search history.

(56) References Cited

U.S. PATENT DOCUMENTS

| | | | |
|---|---|---|---|
| 5,614,927 A * | 3/1997 | Gifford et al. ................. | 715/205 |
| 5,809,503 A | 9/1998 | Aoshima ........................... | 707/8 |
| 5,933,811 A * | 8/1999 | Angles et al. ............... | 705/14.56 |
| 6,014,634 A | 1/2000 | Scroggie et al. ................. | 705/14 |
| 6,073,138 A | 6/2000 | de l'Etraz et al. ............. | 707/104 |
| 6,078,892 A * | 6/2000 | Anderson et al. ............... | 705/10 |
| 6,078,994 A | 6/2000 | Carey ............................ | 711/133 |
| 6,112,209 A | 8/2000 | Gusack ......................... | 707/101 |
| 6,122,658 A * | 9/2000 | Chaddha ....................... | 709/203 |
| 6,148,342 A | 11/2000 | Ho ............................... | 709/225 |
| 6,182,050 B1 * | 1/2001 | Ballard ........................... | 705/14 |
| 6,212,545 B1 * | 4/2001 | Ohtani et al. .................. | 709/202 |
| 6,216,129 B1 * | 4/2001 | Eldering ..................... | 705/36 R |
| 6,253,203 B1 * | 6/2001 | O'Flaherty et al. ............... | 707/9 |
| 6,298,348 B1 * | 10/2001 | Eldering ..................... | 705/36 R |
| 6,311,185 B1 * | 10/2001 | Markowitz et al. ........ | 705/14.49 |
| 6,321,242 B1 | 11/2001 | Fogg et al. ..................... | 707/513 |
| 6,324,541 B1 | 11/2001 | de l'Etraz et al. ............. | 707/104 |
| 6,330,610 B1 * | 12/2001 | Docter et al. .................. | 709/229 |
| 6,338,067 B1 | 1/2002 | Baker et al. ................... | 707/100 |
| 6,345,293 B1 * | 2/2002 | Chaddha ....................... | 709/219 |

(Continued)

FOREIGN PATENT DOCUMENTS

EP    0 802 490 A2   10/1997
WO   WO 01/75647 A2   10/2001

*Primary Examiner* — Eliyah S Harper
(74) *Attorney, Agent, or Firm* — Scully, Scott, Murphy & Presser PC; William Kinnaman, Esq.

(57) ABSTRACT

Advertising is directed to a select list of customers. A request comprising arguments defining a customer interest group is used to perform a blind search of a database. The database comprises public and private information about a customer wherein only the public information is viewable by the search requester. An advertisement is sent on behalf of the requester to the customer address(es) of customer(s) found in the blind search such that private information is not provided to the requester.

20 Claims, 8 Drawing Sheets

(56) References Cited

U.S. PATENT DOCUMENTS

| | | | |
|---|---|---|---|
| 6,393,484 B1 | 5/2002 | Massarani | 709/227 |
| 6,405,212 B1* | 6/2002 | Samu et al. | 1/1 |
| 6,457,007 B1 | 9/2002 | Kikuchi et al. | 707/10 |
| 6,513,052 B1* | 1/2003 | Binder | 1/1 |
| 6,553,178 B2* | 4/2003 | Abecassis | 386/291 |
| 6,625,581 B1* | 9/2003 | Perkowski | 705/27.1 |
| 6,631,357 B1* | 10/2003 | Perkowski | 705/26.61 |
| 6,784,900 B1* | 8/2004 | Dobronsky et al. | 715/744 |
| 6,883,000 B1* | 4/2005 | Gropper | 1/1 |
| 6,928,413 B1* | 8/2005 | Pulitzer | 705/14.14 |
| 7,236,969 B1* | 6/2007 | Skillen et al. | 707/706 |
| 2001/0041053 A1* | 11/2001 | Abecassis | 386/83 |
| 2002/0032674 A1* | 3/2002 | Semple et al. | 707/3 |
| 2003/0040957 A1* | 2/2003 | Rodriguez et al. | 705/14 |

\* cited by examiner

SENDING ADVERTISEMENTS TO CUSTOMERS

CROSS-REFERENCE TO RELATED APPLICATION

Division of application Ser. No. 09/563,693 filed on May 2, 2000 now abandoned.

FIELD OF THE INVENTION

The present invention in relates in general to the field of data processing, and in particular to a method, system and program product for allowing the viewer of a public data set to access related records in a private data set based upon a link which may be selectively provided to the viewer to authorize such access. Access, in alternative embodiments of the invention, may entail the ability to generally read entries in the private data set, or access may be provided in such a manner that the viewer may use the data only in strictly defined ways which may preclude discerning any specific entries in the private data set for a given public record. Specific applications may include the creation of a customized access restricted Web site based upon the private data or a targeted customized marketing deliverable such as advertising via e-mail or conventional mail based thereupon.

BACKGROUND OF THE INVENTION

The incredible growth of the Internet has provided ready access to a wealth of information. The World Wide Web is an ever-expanding repository of information spanning any and all conceivable topics limited only by the imagination of the information content provider. The overwhelming benefits attendant to this ubiquity, however, are counterbalanced to some extent by the inevitable loss of privacy associated with accessing a global computer network.

As the Internet evolves into the dominant commercial medium, merchants seeking to leverage data about Internet user's to better focus their marketing efforts must do so in a manner that respects the privacy interests of their intended customer. Such interests have been the focal point of messages from leaders in government and in the high technology industry. The common theme being that in order to assure the unimpeded commercial growth of the Internet, it is vital that the protection of individual privacy interests is accorded paramount importance. In fact, many leading technology companies refuse do business on-line with firms that do not have a satisfactorily articulated policy on privacy concerns. Industry-backed organizations such as Trust-E help businesses and consumers ensure that they are dealing with companies that have placed the proper importance on on-line privacy rights. Moreover, recent public outcries over intrusive Internet advertising practices are cautionary tales for overzealous Internet marketers.

From the foregoing it can be seen that solutions which provide a means for merchants to make use of customer data while still protecting the privacy interests of individual user's engender considerable interest from the participants in the Internet economy. Owing to the heterogeneous nature of the machines and devices connected to the Internet, simplicity in implementation is a necessary ingredient if any such solution is to be viable. Moreover, the solution should provide the requisite flexibility to allow an Internet user to proactively indicate their desire to selectively provide their private data to selected merchants while their public data (i.e., data which does not reasonably compromise the privacy concerns of the user) is provided to the general audience of merchants on the Internet. Another desirable feature of such a system would be the ability to enable a merchant to target an unidentified consumer via access to such public data, and to provide a "blind" access to private data enabling the merchant to perform target marketing to the unknown consumer based upon public data and the "blind" private data access. Finally, the system should provide access to the private database for performing data mining operations or other types of analysis which do not expose the individual records therein and accordingly raise no privacy concerns. At the present such a system does not exist, and its absence has created a difficult commercial landscape for on-line merchants.

SUMMARY OF THE INVENTION

The foregoing shortcomings of the prior art are overcome and further advantageous features are provided by the present invention wherein is taught a method, system and program product for enabling a requester with read access to public data to read and/or make use of related private data.

In an embodiment of the invention, data entered by a consumer into a Web form is separated into related records in a public and private data set. The public records would be available without restriction for read access by a population of merchants. The private records would be available only per the indication of the consumer to the merchant in the population. The records may, in an embodiment, be logically linked by the inclusion of a common key value into each of these records to indicate, for example, that these records emanated from a common source.

Upon entering the data the consumer may be prompted to indicate whether they wish to provide merchants with access to their private data. This may, in a preferred embodiment, take the form of a box on the Web form which may be checked to indicate that the consumer wishes to be contacted. The consumer may be offered and opportunity to choose among the population of merchant the select merchant to whom they wish their private data to be provided.

Once selected, in accordance with an embodiment of the invention, the merchants may be provided with a pass code, which may in a preferred implementation, be the key value linking the public and private data records in their respective data sets. With the pass code the merchants are provided with the ability to view the particular consumers private data record in the private data set.

In another embodiment of the invention upon designation by the consumer, the various logically linked records in public and private tables for that consumer may be collected and assembled into an output Web page. The Web page is provided at a uniform resource locator (URL) which has been coded with the common key value linking the related records or with another pass code. The merchant for whom access has been indicated is provided either via e-mail or otherwise, with a hyperlink to the coded URL thereby enabling the selected merchant to access both the public and private data.

In yet another set of embodiments, read access is not provided to the private data record, however, an application with access to the private data allows the merchant to make use of the data without being able to read the data. In this manner the consumer need not decide whether or not to allow some or all of the merchants to view their private data, however all of the merchants are given the advantage of the ability to use the private data without compromising the privacy of the consumer.

In an exemplary embodiment the merchants are afforded unrestricted read access to the data records in the public data set and are provided with the ability to data mine or statistically process the whole of the private data set while being restricted from reading any of the individual data records therein.

In another embodiment the merchants are provided with read access to the data records in the public data set, and based on such read access may make a request of an application which has access to the related private data records in the private data sets. The application permits the merchants to use data in the related private records to target, customize and transmit marketing materials to the consumer audience based on their public data and using but not revealing their private data. In this manner the consumer population is benefited by a system which respects their privacy interests and the merchant population is permitted to make use of the large and growing pool of data available about their potential customers.

BRIEF DESCRIPTION OF THE DRAWINGS

The subject matter of the present invention is particularly pointed out and distinctly claimed herein and may be best understood by the following detailed description of the preferred embodiment of the invention taken together with the accompanying drawing wherein:

DETAILED DESCRIPTION OF THE PREFERRED EMBODIMENT OF THE INVENTION

Fundamental to the implementation of the present invention is the notion that a set of data may be parsed into private and non-private elements. At the most simplistic level this might entail, for example, identifying input fields on a Web page as requiring sensitive data input such as an address, credit card or social security number, versus non-sensitive information such as the name of the item being purchased, the date, time etc. At a more sophisticated level this notion might entail the combination of otherwise non-sensitive data elements into a combined sensitive data construct. For example, information such as the state and town in which a person resides may be itself be deemed not sensitive but when combined with the person's occupation and alma mater, it may become a simple task to narrow the field down to a single person, and as such the combination of that data may be deemed sensitive. For purposes of the present invention the mechanics by which the various data elements are parsed into sensitive and public data sets is not critical, however the notion that such separation, at various levels of sophistication and granularity can, and does occur, is essential to the practice of the invention.

Figure 1:
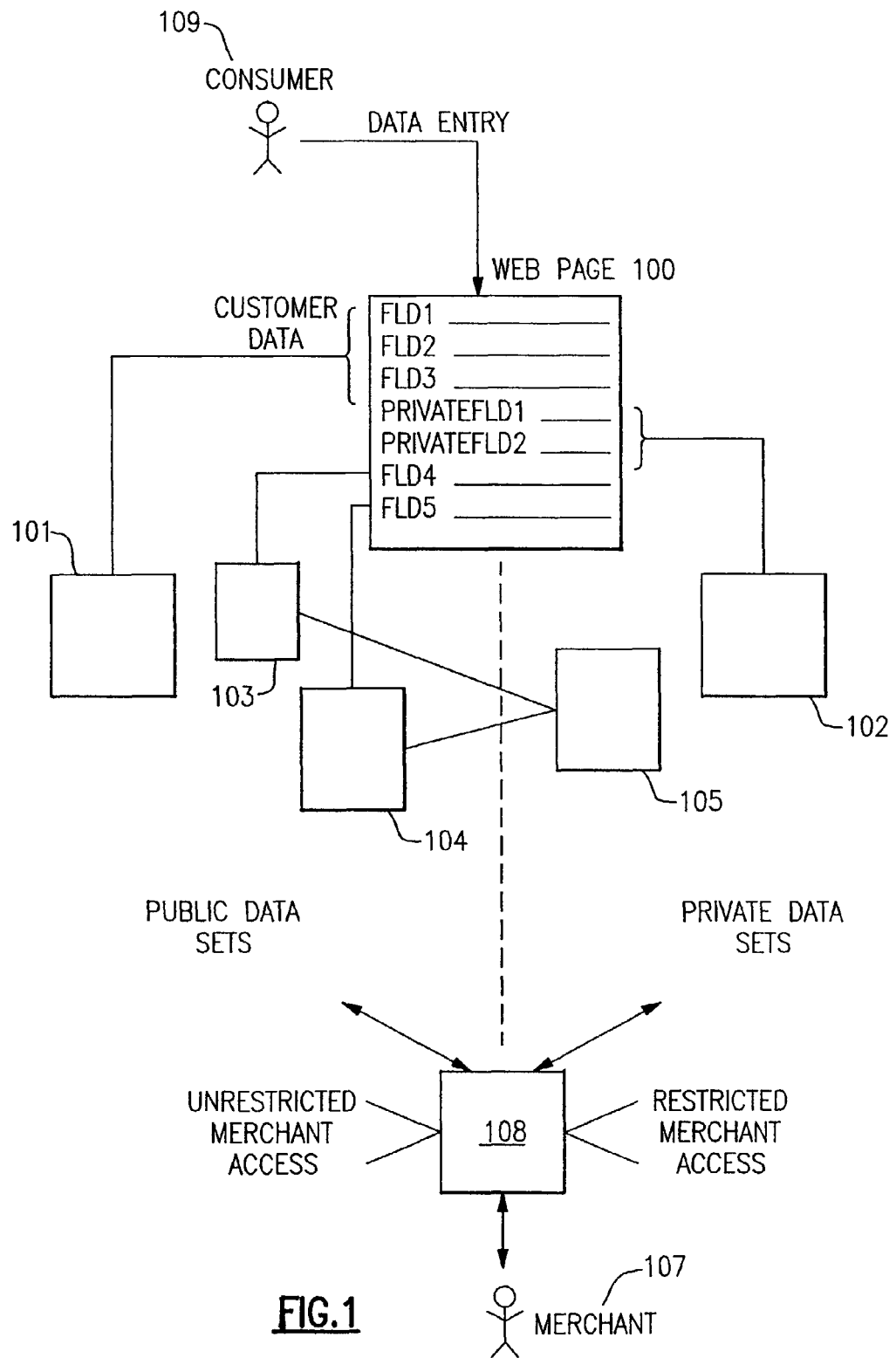
FIG. 1 illustrates a set of data elements parsed into private and public data sets.

FIG. 1 illustrates such a distribution of data which may emanate from a customer input source such as common gateway interface (CGI) fields on a Web page 100 into public 101 and private 102 data sets. It is of course understood that the source of such data may come from any number of sources, including without limitation, surveys, transactional data, etc. and is not limited to customer interactions over the World Wide Web. As previously noted, such separation of data elements may be accomplished using known techniques to any desired level of granularity, resulting potentially in multiple public and private data sets and in the combination of individually public data sets 103, 104 into a combined private data set 105. The public 101 and private 102 data sets are, in a preferred embodiment, relational databases such as DB2 (DB2 is a registered trademark of IBM Corporation).

As a result of the distribution of data elements among various public and private data sets, it is desirable to establish a level of control over access to the public and private data stored therein. For purposes of the present invention it will suffice to assume that a public data set is available, without restriction, to the entire population of Internet users, or, as will more likely be the case, to a select subset of merchants 107 who subscribe to a marketing service that accumulates such data. With the public data elements, however, as opposed to data elements in the private data sets, there are no discrete access restrictions in place which would prevent a general member of the potential population from viewing the data from undertaking such access. The present invention is directed toward providing the level of control 108 required in keeping the public and private data separate, and allowing access to the private data either at the explicit direction of the consumer 109 (the individual that is the subject of the public and private data) or in such a manner as to protect the privacy concerns of the consumer.

Figure 2:
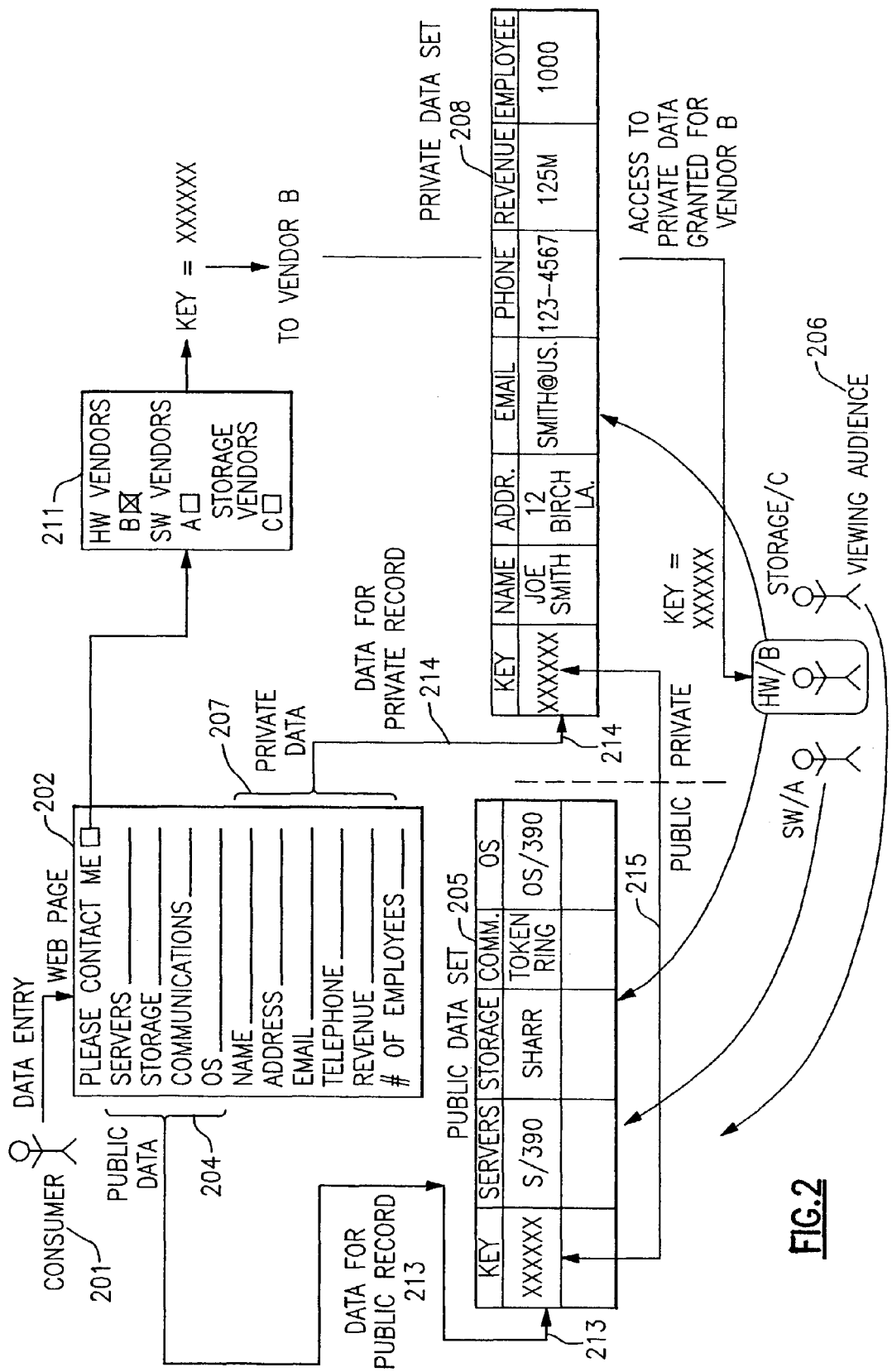
FIG. 2 depicts the separation of public and private data into their respective data sets and a consumer designated access for specified members of the viewing population to the private data set.

In a first embodiment of the invention, illustrated in FIG. 2, a consumer 201, upon entering information to a Web page 202, is given an option 203 to designate that they wish to be contacted regarding the particular Web transaction. As an example we will assume that the Web page is in the form of a questionnaire soliciting information regarding the make up of the information technology infrastructure of the consumer's business. As illustrated in FIG. 2 the consumer is asked to enter information 204 regarding the hardware platforms and software systems he/she is running as well as storage solutions and communication technologies comprising the consumers business. The particular responses to theses technical queries, for purposes of this example, we will designate as being public data. That is to say, the particular hardware, software and storage solution responses made by the consumer will be stored as a single record 213 in a public data set 205. The public data set does not impose any access restrictions to its viewing audience 206. Other items of information, such as the name, location, phone, e-mail, revenue, number of employees, may for our purposes, be designated as a single record 214 of private data elements 207 and as such will be stored separately in a private data set 208 which imposes certain restrictions on access by the viewing audience 206.

The single record 213 in the public data set 205 is related logically 215 to the single record 214 in the private data set 206. The link authorizing a viewer of a record in the public data set 205 to related data in the private data set 206 makes use of this logical relation between the records stored in the table to ensure that the public data and private data for which access is provided correlate to one another. In a preferred embodiment the logical link between a record in the public and the private data sets is a randomly generated numeric key 216, in a manner known to those skilled in the art of a random design.

If the consumer 201 designates a desire to be contacted 203, the consumer's contact information, which may for example include any or all of the following: name, address, phone, and e-mail, has been stored in the private data set 208, and linked by the logically related records 213, 214 will become accessible to those members of the viewing audience 206 designated by the consumer as a potentially desired marketing contact. In an embodiment, the consumer may be presented with a menu 211 of potential solution providers, which may be segmented based upon the types of solutions which the customer is interested in learning more about. As such, the customer may be provided with a list of, for example, hardware only or hardware and software vendors. This level of control allows the customer to selectively provide his/her contact information to a subset of the viewing audience 206 with whom the customer wishes to interact, without opening up the otherwise private data to the entire viewing audience 206 for uncontrolled public access.

Once the consumer 201 has selected the set of merchants with whom contact is desired, a number of mechanisms may be employed to provide access to the designated merchants. In a preferred embodiment, the merchants may be provided with a the value of the key XXXXXX identifying the records 213, 214 with which access to the designated contact information may be enabled. It is useful to note that the present invention contemplates that provision of access to the data elements in the private data set may be made on an element-by-element basis, that is to say, that the merchant may be provided with access to certain select pieces of private data within the single data record 214, such as the contact information (name, address, phone number, e-mail) but not to other sensitive data such as revenue, credit card etc.

Figure 3:
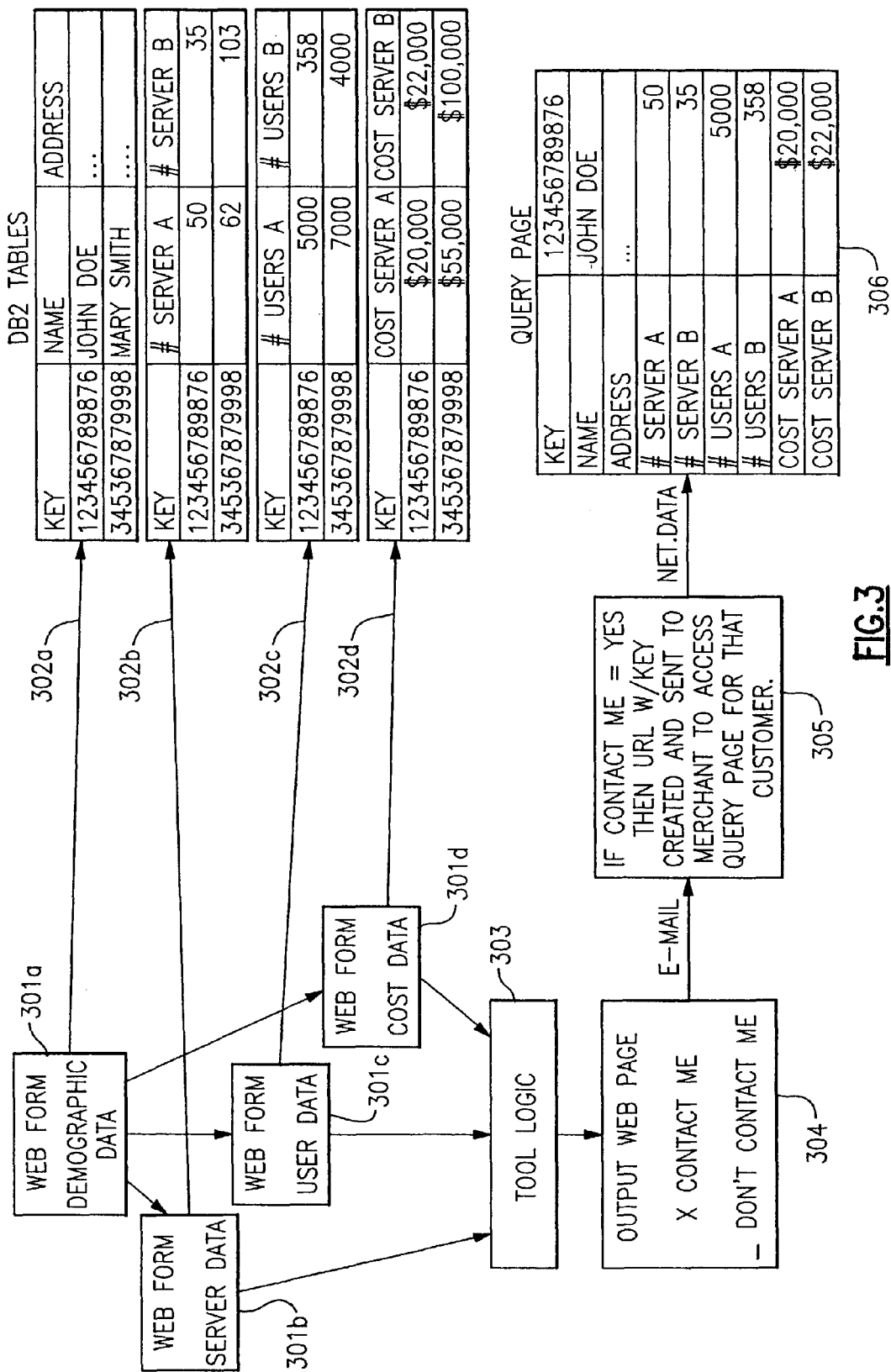
FIG. 3 illustrates an alternative embodiment wherein the combined public and private data is provided to a merchant in the form of a customized Web page using a specific key inserted into the uniform resource locator (URL) for the Web page.

In another embodiment, depicted in FIG. 3, the combined information including the contact information from the private data set and the technical data from the public data set may be provided to the merchant by way of a customized Web page using a uniform resource locator (URL) that includes the command required for accessing the restricted data set.

Turning to FIG. 3 it is seen that a web form may generate a number of data sets 301a-d including demographics 301a, server data 301b, user data 301c, and cost data 301d. Any of these data sets may be designated as including private data, and the remaining data sets include public data. Each time a new customer enters web form data, a record is created in the respective DB2 tables 302a-d associated with the segmented data 301a-d. It may be further observed that related records stored in tables 302a-d are assigned a common value in the "key" field. In the illustration, for example, it can be seen that the key value 123456789876 is assigned to the records for John Doe. Table 302a holds-demographic information including John Doe's name, address etc. Table 302b indicates the number of each type of server John Doe has in his-enterprise (50 Server A, 35 Server B, . . . ), and is linked to related records in other tables by the inclusion of the key value 123456789876 in the key field. Likewise, table 302c includes a record indicating the number of users for each server type indicated in table 302b and linked by the key value 123456789876 to the records in tables 302a, b and d. Finally, table 302d includes information regarding the cost of each of the server types for John Doe, linked to the related records in the other tables 302a-c by the inclusion of the key value 123456789876.

The related records in these tables may be aggregated through a tool 303 which, in response to a designation by the consumer who has entered the data (John Doe in our example) will aggregate the related records in the various tables 302a-d into an output web page 304 which will present an analysis of the data that will entice the customer to request that he be contacted by a merchant. The consumers information will be made accessible to a merchant with whom the designated contact is designated, for example, by way of an e-mail 305 provided to the merchant and including a hyperlink to the key-coded URL. Via the key-coded URL the merchant may access the query page 306 including the combined related records for John Doe joined by the logical relationship of the key value 123456789876. In a preferred embodiment the Web access to this combined table data may be accomplished by use of the IBM Net.Data software product.

Regardless of whether the implementation illustrated in FIG. 2 or FIG. 3 is undertaken, once the merchant has access to the private data 208 through this process, the merchant may use that data to market their solutions to the consumer 201. Since access to this private data was initiated by actions taken by the consumer 201, the subsequent contacts from the merchants will be anticipated by the consumer and will not be considered by the consumer as encroaching on his/her privacy interests.

Figure 4:
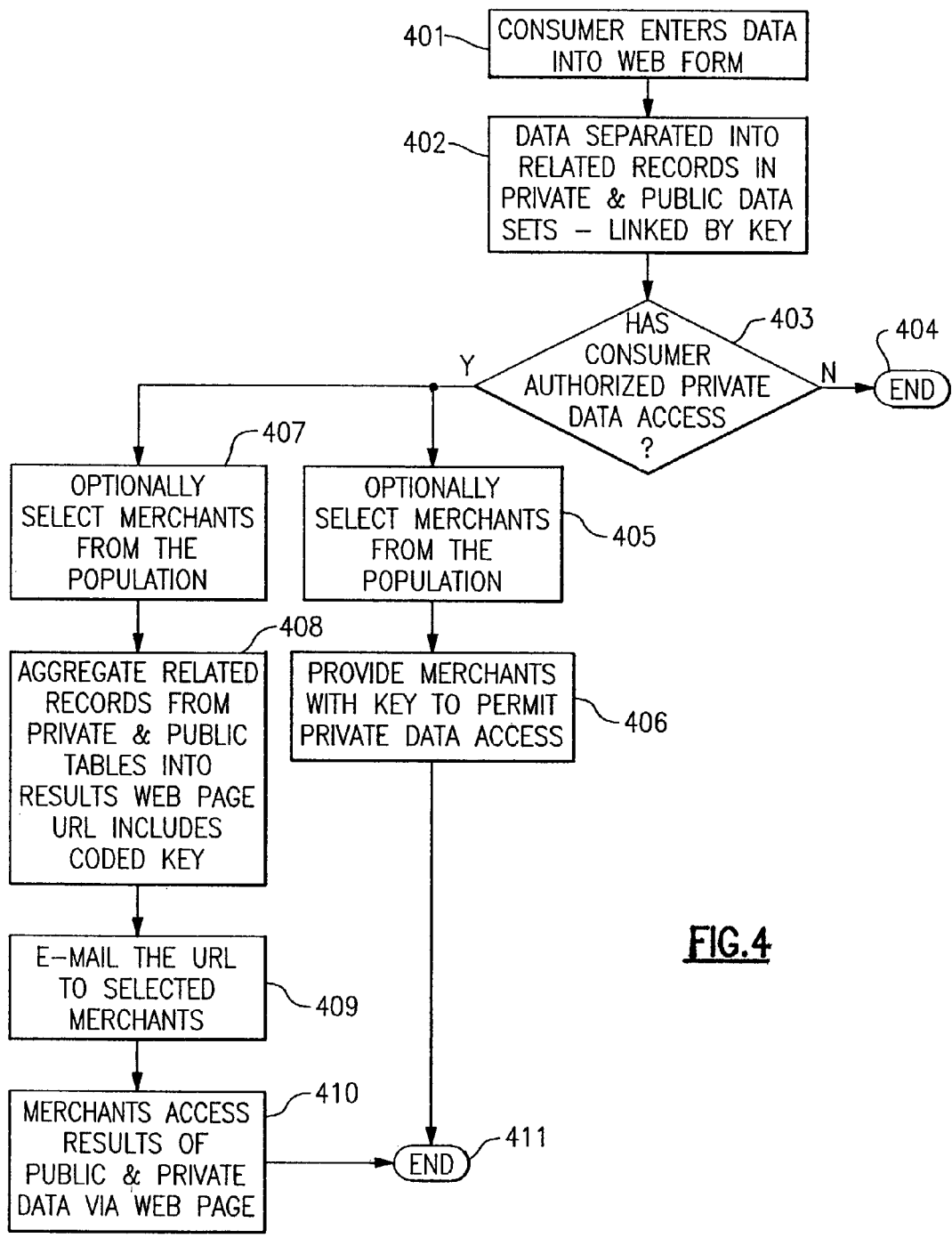
FIG. 4 illustrates a flow diagram detailing the steps involved in practicing the embodiments of the inventions described via reference to FIG. 2 and FIG. 3.

A flow diagram 400 provided in FIG. 4 illustrates the steps undertaken in practicing the foregoing embodiments. In step 401 a consumer enters data into a web form. In step 402 the entered data is separated and inserted as data records in public and private data sets which records are linked by a common key value assigned thereto and which may be stored in the tables as part of the record. At decision point 403 it is determined whether the consumer has indicated (via an entry on the web form or otherwise) a desire to be contacted by a merchant (or for that matter more specifically a willingness to permit a view of their private data). If the consumer has indicated a desire to have their private data remain private, the "no" path is traversed an the process is ended 404. Alternatively, if the consumer indicates that their data may be accesses the "yes" path is traversed and the process continues either in accordance with the embodiment described in FIG. 2 (steps 405-406) or FIG. 3 (steps 407-410).

The remaining steps in accordance with the embodiment for FIG. 2 are as follows: The consumer may optionally select 405 particular merchants from the population of merchants with access to the public data set 205. Of course, the consumer may merely indicate that they wish their data to be accessible or restricted on a global basis as well. The selected merchants are provided with a key which enables them to access the private information 406. Optionally, the key may be the logical link between the data in the public and private data sets. The process is then ended 411.

The remaining steps in accordance with the embodiment in FIG. 3 are similar: Once again the consumer may optionally select among the population of merchants with access to the public data, certain merchants to whom they wish to grant private data access 407 or access may be granted globally. Next in step 408 the various tables of data 302a-d which may contain private or public information are aggregated into a query result web page having a URL which is coded with an identifier which in a preferred embodiment is the key value 123456789876 used to logically relate the records in the various tables 302*a-d*. In step 409 those vendors for whom access has been indicated by the consumer in step 407 are provided with an e-mail including a hyperlink to the key-coded URL through which the merchant may access 410 the results of the combined consumer data. The process is then ended 411.

As will be appreciated, the foregoing embodiments possesses numerous advantageous features. The separation of data into public and private data sets creates a volume of public data which is generally usable by the viewing public 206. This data has value by itself for marketing purposes, as it can be used for data mining to spot trends, in IT purchasing etc. Moreover, the selective access 203 to the private data set 208 provides a merchant with consumer-controlled access to private data which prevents massive unintended access while allowing those selected merchants to benefit from access to the data.

While the previously described embodiment of the invention does address certain privacy concerns it also severely limits the use of the data designated as private. In particular, since the prior implementations enable the selected merchants to view the consumer's private data, it is to be expected that the set of selected merchants would be relatively small. Accordingly, the implementation does not equally benefit the entire community of merchants.

Further alternative embodiments of the invention provide a mechanism wherein the entire viewing audience of the public data may benefit from access to the private data without exposing the private information to the viewing audience. This type of access would not have as a prerequisite an explicit authorization for the merchant access by the customer. In this model such authorization is not needed since the access itself will entail constraints preventing the merchant from perceiving the data elements in the private data set 208. That is, in general, this type of access would entail a restricted form of access to the private data set which would allow any merchant to use the information stored therein without enabling the merchant to perceive any individual data entries.

Figure 5:
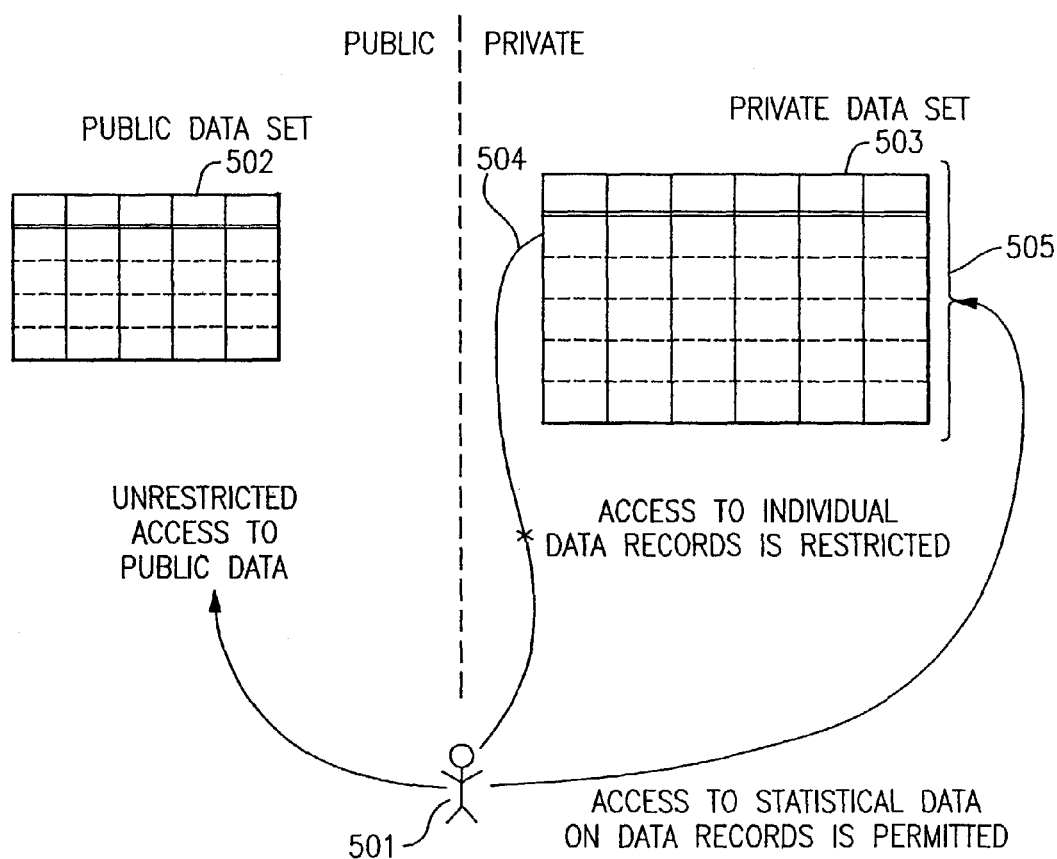
FIG. 5 depicts an embodiment wherein unrestricted access is permitted to a public data set and wherein access is denied to individual records and of a private data set, but wherein access to statistical information regarding the records in the private data set is permitted.

A very simplistic alternative embodiment that addresses such concerns is illustrated in FIG. 5. In FIG. 5 the a viewer 501 of the public data set 502 is granted a restricted access to the private data set 503 wherein the ability to read the contents of individual data records 504 is inhibited 506, however the ability to statistically evaluate or data mine the entire private data set is enabled 505. In this manner, a viewer of the public data set 502 may benefit from the access to the private data set 503 without revealing any of the discrete private data elements stored within the data records 504 therein.

Figure 6:
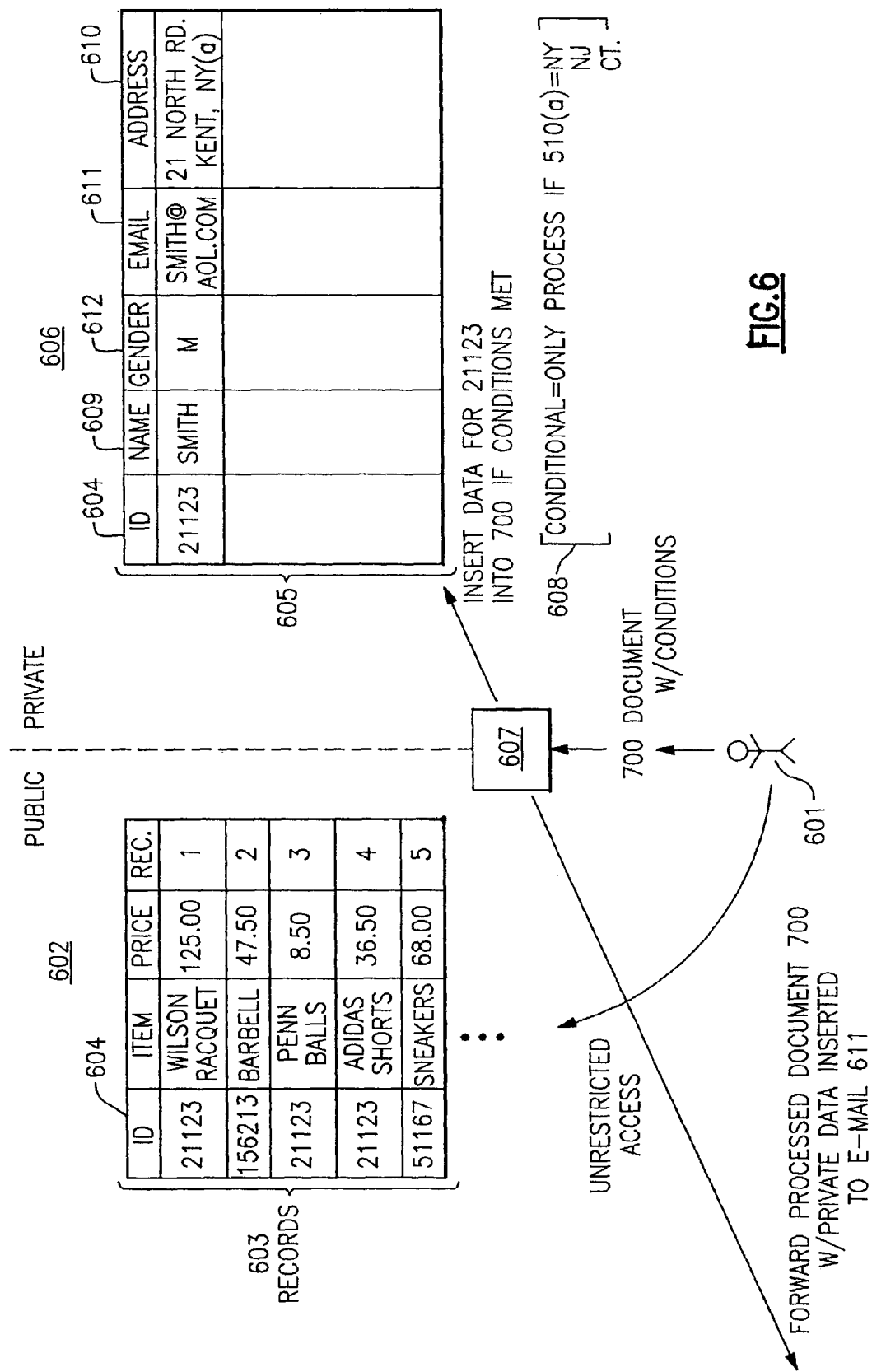
FIG. 6 illustrates an embodiment of the invention wherein an application with access to the private data set allows a merchant to have blind access to the private data wherein the data may be used, but not read, by the merchant.

Another interesting embodiment that permits limited access to the data entries in the private data set while preventing the merchant from reading the individual data entries therein is described via reference to FIG. 6. A viewer 601 of a public data set 602 can identify various records 603 as belonging to the same consumer by virtue of an identifier field 604, which includes a unique value for each consumer, but which in no way reveals the identity of the consumer. For example, public records 1, 3 and 4 all show the consumer ID as 21123. This indicates that the same consumer is associated with these public data records, however it does not reveal any of the consumer's private data entries which are retained in data records 605 stored in the private data set 606. For purposes of consistency we shall refer to this consumer ID as identifying but not revealing the consumer. Revealing the consumer, according to the invention, would entail providing read access to the data records 605 for that consumer in the private data set 606 to the merchant 601. The premise of the present embodiment is to use the identifier 604 to permit a merchant to make use of the private data entries 605 for the consumer without providing the merchant with the ability to read those entries, we shall refer to this as "blind access" to the private data, hence the merchant secures the benefits of accessing the private data for the consumer without revealing the consumer to the merchant.

Upon analyzing the public data set 602 a merchant 601 may locate a particular piece or pieces of data regarding a consumer 21123 which incent the merchant to want to have blind access to the private data. For example, by analyzing the entries in the public data set 602, a merchant 601 selling tennis lessons may notice that a particular consumer 21123 has recently purchased a new tennis racquet (record 1), tennis balls (record 3) and tennis shorts (record 4). Based on the foregoing records the merchant 601 may determine that consumer 21123 is an ideal candidate for his tennis lessons. In our example, we will assume that the merchant 601 has a marketing deliverable which he would like to automatically customize and e-mail to consumer 21123, assuming that the consumer resides within the same state as at least one of one the merchant's various tennis centers (NY, NJ or CT.).

A separate application 607 with access to the private data set 606 serves as an interface for messages generated by the merchants 601 which may include certain data elements from the public data set 602. The application 607 enables the so-called blind access to the data in the private data set 606.

Figure 7:
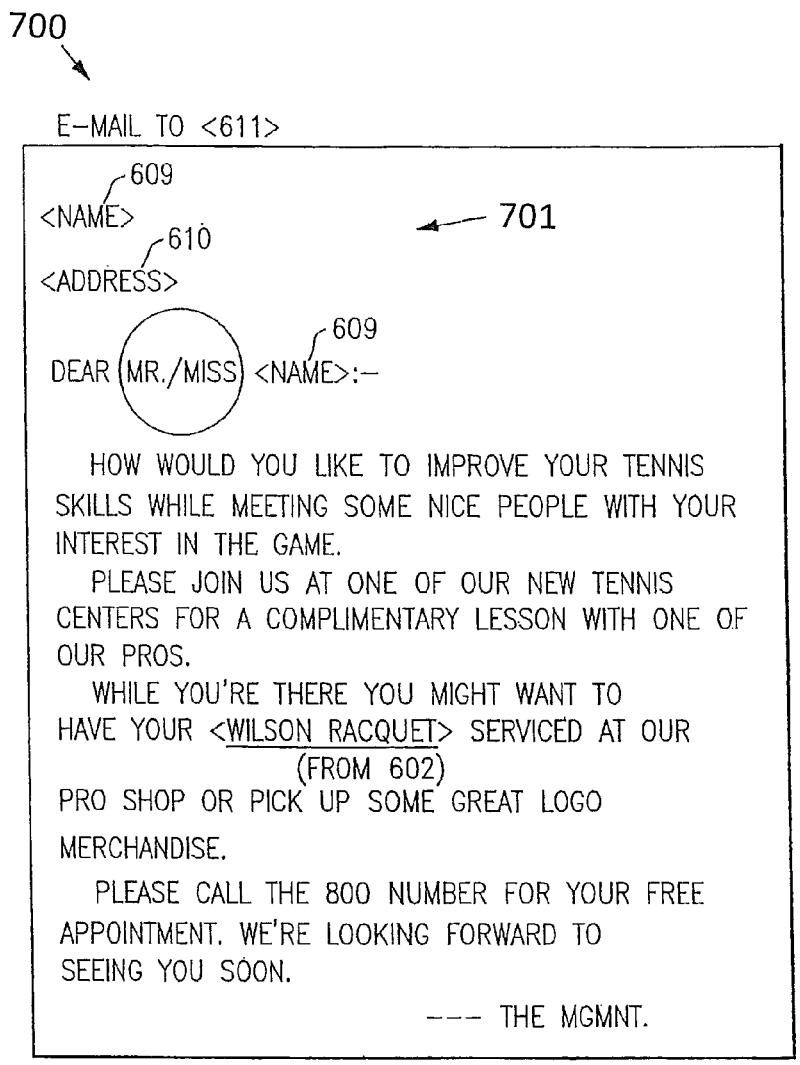
FIG. 7 depicts an example of marketing material that is constructed to be tailored by insertion of public and private data and customized by the values in the private data set and transmitted to a consumer at an e-mail address from the private data set.

In our example the merchant would send a soft copy document such as the one illustrated in FIG. 7. The document 700 would include variables 701 representing the data elements to be inserted from the private data set 606 and may be pre-populated with data 602 from the related records (records 1, 3 and 4 belonging to identifier 21123) public data set 602.

In a preferred embodiment the merchant 601 may impose a condition 608 on the execution of application 607 so as to limit the execution of the application to those private data records which satisfy the condition. In our example the merchant 601 has forwarded the document 700 to the application 607, and has instructed that the name 609 of the owner of the record having the identifier 21123 be inserted into the document, as well as his address 610, and that the document be forwarded to the owner's e-mail address 611, however, the merchant only desires that such actions be performed where the owner's state of residence (610*a*) is equal to NY, NJ or CT, the states in which his tennis centers are located. Moreover, certain portions of the document 700 may be conditioned on the values of the data in the private table 606. For example, in the greeting the selection between the title Mr. or Ms. May be conditioned on the value of the gender field 612 for the record 21123.

If the conditions are met, the data 609, 610 from the private data set 606 is inserted into the designated positions in document 700 and the document is forwarded by the application 607 to the owner's e-mail address 611. It is important to note at this point that at no time throughout this process has the merchant 601 had the ability to read any of the data in the private data set 606. Notwithstanding this restriction however, the merchant 601 was able to identify, via access to purchase data in a public data set 602, public purchase records belonging to a consumer 21123 who, based on these purchases, may be interested in receiving targeted marketing 700 from the merchant 601. With nothing more than this public data, the merchant is permitted to create a a targeted marketing document 700 utilizing public data 602 and through the use of an application 607, is provided with the means to have appropriate private data 609, 610 inserted into the document to further refine the marketing material to the consumer without being given the ability to read the private data. Furthermore, the insertion of the private data and subsequent transmission of the document to the consumer 21123 may be conditioned on the satisfaction of conditions based on the private data which are imposed by the merchant and evaluated by the application. Accordingly, the merchant may create a targeted marketing deliverable tailored specifically to an individual consumer and send it to that individual consumer using but not ever seeing the consumer's private data. This satisfies the merchant's desire to make use of the consumers purchasing data to better focus his marketing, while respecting the privacy interests of the consumer.

Figure 8:
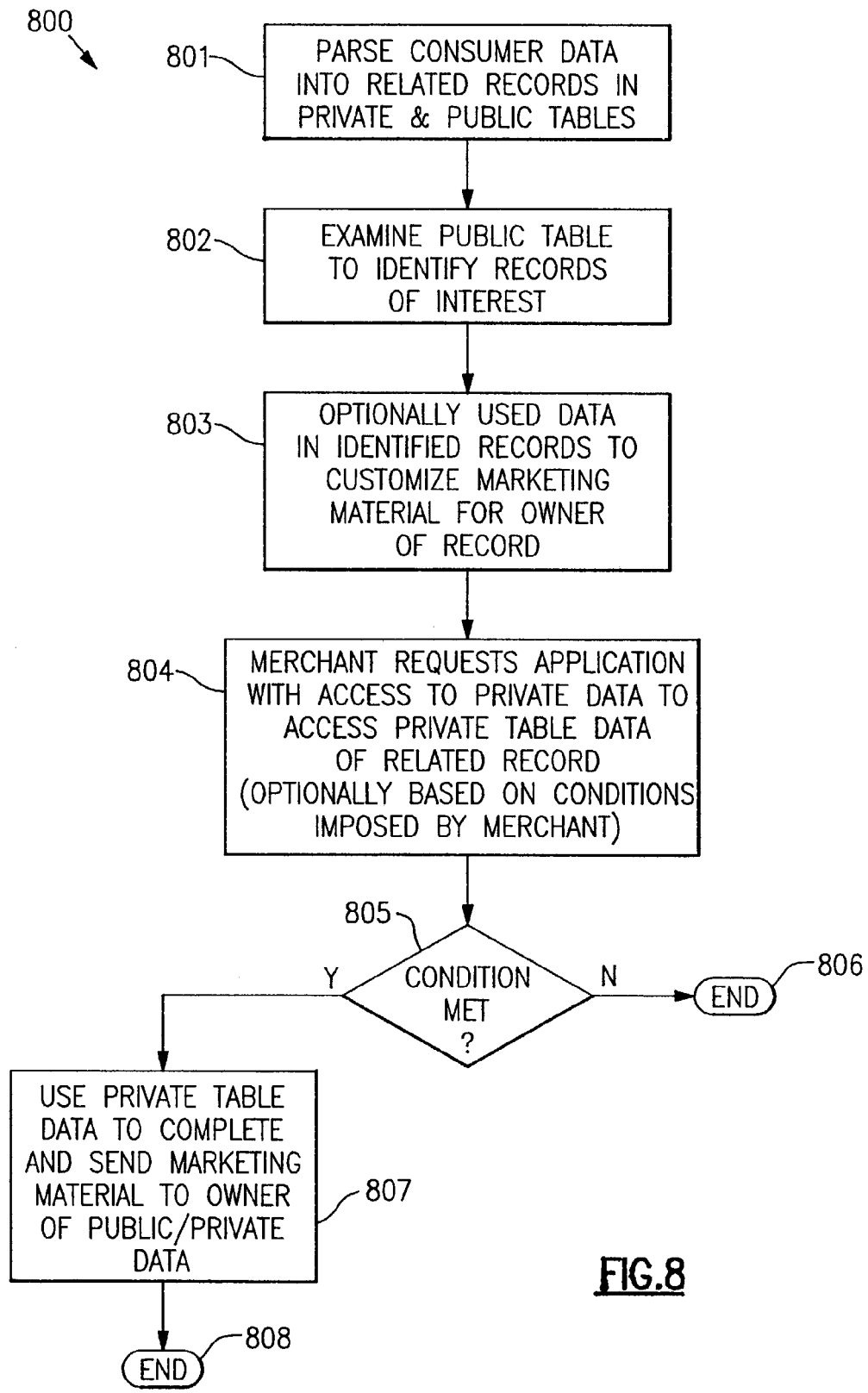
FIG. 8 presents a flow diagram illustrating the steps involved in implementing the system of FIGS. 6 and 7.

The flow diagram 800 in FIG. 8 illustrates the steps undertaken in performing the embodiment of the invention as described in FIGS. 6 and 7. Starting at step 801 data from a consumer is parsed into related records in public and private tables. Next, in step 802 the merchant examines public data to identify records whose owner has interests aligned with the merchant's offerings. Next, in step 803 the merchant may utilize the data from the public table to tailor a marketing deliverable to the owner of the identified record in the public table from step 802. In step 804 the merchant makes a request of an application which has access to the data in the private table to access the private table, and specifically the record in the private table related to the identified public record from step 802, here the merchant may optionally impose conditions on the accessing of the private table by the application. If the merchant imposes conditions they are analyzed at decision point 805 if they are not met the process is ended 806, if they are met the application is instructed to use the private table data for the related record to complete the marketing material, and to send the material to the owner of the identified public and private data records 807. Finally, the process is ended at step 808.

It is understood that while the foregoing embodiment has been directed at the creation and transmitting of marketing materials other implementation which make use of the related records between a public and private table and an application which enables "blind access" to allow an entity to make use of the private records without revealing such private data to the entity would be considered to fall within the scope of the present invention. Moreover, while the foregoing invention has been described by reference to several preferred embodiments it is to be understood that various alterations, improvements and modifications may be made by those skilled in the art without departing from the spirit of the invention. These are considered to be within the scope of the present invention as defined by the following claims.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for directing advertising to a select list of customers, the method comprising:
   providing a public data set and a private data set;
   giving a search requestor on a first computer access to the public data set;
   said search requestor searching through said public data set and, on the basis of said searching, said search requestor identifying a record from a specific customer, said record including an identifier for said specific customer;
   said search requestor sending to a viewer application, a request comprising said identifier for the specific customer, and one or more given conditions;
   said viewer application on a second computer receiving said request and an advertisement to promote or make known, the advertisement to be sent to selected customers;
   said viewer application using said identifier to perform a blind search through the private data set, on behalf of said search requestor, to identify one or more records in the private data set from said specific customer, and using said one or more records in the private data set, to determine whether the specific customer meets said one or more given conditions, wherein only the public information is viewable by said search requestor; and
   said viewer application transmitting the advertisement on behalf of said search requestor to said specific customer at addresses found in the blind search; and wherein:
   the public data set includes code identifiers for a number of customers;
   the identifying a record from a specific customer includes the step of obtaining from the public data set a respective one of the code identifiers for each of a plurality of the customers, said plurality of customers including said specific customer;
   the sending to a viewer application includes the search requestor sending to the viewer application said code identifiers for said plurality of customers;
   the providing a public data set and a private data set includes including in the private data set records having the code identifiers for one or more of said plurality of customers; and
   the performing a blind search includes searching through the private data set for records having code identifiers matching the code identifiers received from the search requestor.

2. The method according to claim 1, comprising further:
   before transmitting the advertisement to the customers, the viewer application personalizing the advertisement for each of the customers that meet said one or more given conditions based on the information about the customer found in the blind search.

3. The method according to claim 1, wherein the transmitting step is transmitting electronic mail.

4. The method according to claim 1, wherein the private information comprises any one of a customer post office address, customer phone number or customer electronic address.

5. The method according to claim 1, comprising further:
   transmitting the advertisement to the viewer application.

6. A system for directing advertising to a select list of customers using a public data set and a private data set, the system comprising;
   a network;
   a computer system in communication with a search requestor and a viewer application computer systems by way of the network wherein the computer system includes instructions to execute a method comprising the steps of:
   giving the search requestor on a first computer access to the public data set;
   enabling said search requestor to search through said public data set and, on the basis of said searching, said search requestor identifying a record from a specific customer, said record including an identifier for said specific customer;

enabling said viewer application on a second computer to receive from the search requestor, a request comprising said identifier for the specific customer, and one or more given conditions;

said viewer application using said identifier to perform a blind search through the private data set, on behalf of said search requestor, to identify one or more records in the private data set from said specific customer, and using said one or more records in the private data set to determine whether the specific customer meets said one or more conditions, wherein only the public information is viewable by said search requestor; and said viewer application transmitting an advertisement on behalf of said search requestor to said specific customer at an address found in the blind search; and wherein:

the public data set includes code identifiers for a number of customers;

the identifying a record from a specific customer includes obtaining from the public data set a respective one of the code identifiers for each of a plurality of the customers, said plurality of customers including said specific customer;

the sending includes the search requestor sending to the viewer application said code identifiers for said plurality of customers;

the private data set includes records having the code identifiers for one or more of said plurality of customers; and the step of performing a blind search includes the step of searching through the private data set for records having code identifiers matching the code identifiers received from the search requestor.

7. The system according to claim 6, wherein the method comprises further the viewer application personalizing the advertisement for each of the customers that meet said one or more given conditions based on the information about the customer found in the blind search.

8. The system according to claim 6, wherein the transmitting transmits electronic mail.

9. The system according to claim 6, wherein the private information comprises any one of a customer post office address, customer phone number or customer electronic address.

10. The system according to claim 6, wherein the method comprises further:
transmitting the advertisement to the viewer application.

11. A computer program product for directing advertising to a select list of customers using a public data set and a private data set, the computer program product comprising a hardware storage medium readable by a processing circuit and storing instructions for execution by the processing circuit for performing a method comprising:

giving a search requestor on a first computer access to the public data set;

enabling said search requestor to search through said public data set and, on the basis of said searching, said search requestor identifying a record from a specific customer, said record including an identifier for said specific customer;

receiving a request from said search requestor, the request comprising said identifier for the specific customer, and one or more given conditions;

receiving from the search requestor an advertisement to promote or make known, the advertisement to be sent to selected customers in the interest group;

using said identifier to perform a blind search of a database through the private data set, on behalf of said search requestor, to determine whether the specific customer meets said one or more given conditions, wherein only the public information is viewable by said search requestor; and transmitting the advertisement on behalf of said search requestor to said specific customer at an address found in the blind search; and wherein:

the public data set includes code identifiers for a number of customers;

the identifying a record from a specific customer includes obtaining from the public data set a respective one of the code identifiers for each of a plurality of the customers, said plurality of customers including said specific customer;

the receiving a request from the search requestor includes the search requestor sending to the viewer application said code identifiers for said plurality of customers;

the private data set includes records having the code identifiers for one or more of said plurality of customers; and the step of performing a blind search includes searching through the private data set for records having code identifiers matching the code identifiers received from the search requestor.

12. The computer program product according to claim 11, wherein the method further comprises:
before transmitting to a customer, personalizing the advertisement for each of the customers that meet said one or more given conditions based on the information about the customer found in the blind search.

13. The computer program product according to claim 11, wherein the private information comprises any one of a customer post office address, customer phone number or customer electronic address.

14. The computer program product according to claim 11, wherein the method further comprises:
transmitting the request to a blind search application, the blind search application being adapted to perform the receiving the request, the receiving the advertisement and the performing the blind search of the database, the request comprising the search arguments wherein the search arguments define the customer interest group; and
transmitting the advertisement to the blind search application, the advertisement to be sent to customers in the interest group.

15. The method according to claim 1, wherein the public information is provided for the blind search by a public database and the private information is provided for the blind search by a private database not directly accessible by the search requester.

16. The system according to claim 7, wherein the public information is provided for the blind search by a public database and the private information is provided for the blind search by a private database not directly accessible by the search requester.

17. The computer program product according to claim 1, wherein the public information is provided for the blind search by a public database and the private information is provided for the blind search by a private database not directly accessible by the search requester.

18. The method according to claim 1, wherein the viewer application is a web service.

19. A method according to claim 1, wherein:
the advertisement includes a document having a multitude of fields;
the search requestor adds data, from the public data set, to a first group of said fields;

the search requester includes variables in a second group of said fields, said variables representing data to be inserted into said second group of fields;

the viewer application adds data, from the private data set, to the second group of said fields, and said given conditions are based on data in the private data set.

20. The computer program product according to claim 11, wherein the storage medium is a non-transitory storage medium.

* * * * *